(12) United States Patent
Godbold

(10) Patent No.: US 7,584,743 B2
(45) Date of Patent: Sep. 8, 2009

(54) NOISE REDUCTION FOR AN INTERNAL COMBUSTION ENGINE

(75) Inventor: Clement Vanden Godbold, Rock Hill, SC (US)

(73) Assignee: Deere & Company, Moline, IL (US)

( * ) Notice: Subject to any disclaimer, the term of this patent is extended or adjusted under 35 U.S.C. 154(b) by 71 days.

(21) Appl. No.: 11/742,730

(22) Filed: May 1, 2007

(65) Prior Publication Data

US 2008/0078610 A1 Apr. 3, 2008

Related U.S. Application Data

(60) Provisional application No. 60/848,931, filed on Oct. 3, 2006.

(51) Int. Cl.
F02B 77/08 (2006.01)
F02B 77/11 (2006.01)
(52) U.S. Cl. .................................. 123/399; 123/319
(58) Field of Classification Search ................ 123/319, 123/399, 331, 356, 361; 181/182; 381/71.1, 381/71.4, 71.5
See application file for complete search history.

(56) References Cited

U.S. PATENT DOCUMENTS

| | | | |
|---|---|---|---|
| 4,539,947 A | * | 9/1985 | Sawada et al. ......... 123/184.57 |
| 4,546,733 A | * | 10/1985 | Fukami et al. ......... 123/184.57 |
| 5,097,923 A | * | 3/1992 | Ziegler et al. ............. 181/206 |
| 5,163,289 A | * | 11/1992 | Bainbridge ................. 60/274 |
| 5,359,662 A | * | 10/1994 | Yuan et al. ............... 381/71.14 |
| 5,801,344 A | | 9/1998 | Herold |
| 6,332,510 B1 | | 12/2001 | Frederiksen et al. |
| 6,520,286 B1 | | 2/2003 | Frederiksen et al. |
| 6,719,078 B2 | | 4/2004 | Nakamura |
| 6,769,511 B1 | | 8/2004 | Brooks et al. |
| 6,988,057 B2 | | 1/2006 | Huang et al. |
| 2003/0098200 A1 | | 5/2003 | Clark |

FOREIGN PATENT DOCUMENTS

JP 2004301028 * 10/2004

OTHER PUBLICATIONS

JP 2004301028 (Isobe H.) Oct. 28, 2004 (abstract). [retrieved on Jan. 22, 2009]. Retrieved from Dialog DataStar.*

* cited by examiner

Primary Examiner—Mahmoud Gimie

(57) ABSTRACT

A method and system for reducing noise associated with an internal combustion engine comprises operating an engine at an initial speed. An exhaust system has a resonant cavity to attenuate exhaust noise. A microphone detects a sound level at or near an exhaust system of the engine operated the initial speed. A controller controls or adjusts the initial speed to a revised speed if the detected sound level does not meet or fall below a desired sound level.

26 Claims, 8 Drawing Sheets

NOISE REDUCTION FOR AN INTERNAL COMBUSTION ENGINE

This document (including the drawings) claims priority based on U.S. provisional Ser. No. 60/848,931, filed Oct. 3, 2006, and entitled NOISE REDUCTION FOR AN INTERNAL COMBUSTION ENGINE, under 35 U.S.C. 119(e).

FIELD OF THE INVENTION

This invention relates to noise reduction for an internal combustion engine.

BACKGROUND OF THE INVENTION

Mufflers are generally used to reduce exhaust noise for internal combustion engines. Although quarter wavelength attenuation cavities or stubs can theoretically reduce exhaust noise, as a practical matter quarter-wavelength stubs generally attenuate noise over a narrow frequency band. Variations in engine speed, manufacturing tolerances of exhaust systems, and thermal expansion of exhaust systems, among other things, may cause one quarter-wavelength stubs to be less effective at attenuating noise. Accordingly, there is a need to compensate for the above problems to achieve efficient attenuation with one quarter-wavelength stubs or other resonant cavities.

SUMMARY OF THE INVENTION

A method and system for reducing noise associated with an internal combustion engine comprises operating an engine at an initial engine speed. An exhaust system has a resonant cavity to attenuate exhaust noise. A microphone or transducer detects a sound level at or near an exhaust system of the engine operated the initial engine speed. A controller controls or adjusts the initial engine speed to a revised engine speed if the detected sound level does not meet or fall below a desired sound level.

DESCRIPTION OF THE PREFERRED EMBODIMENT

Figure 1:
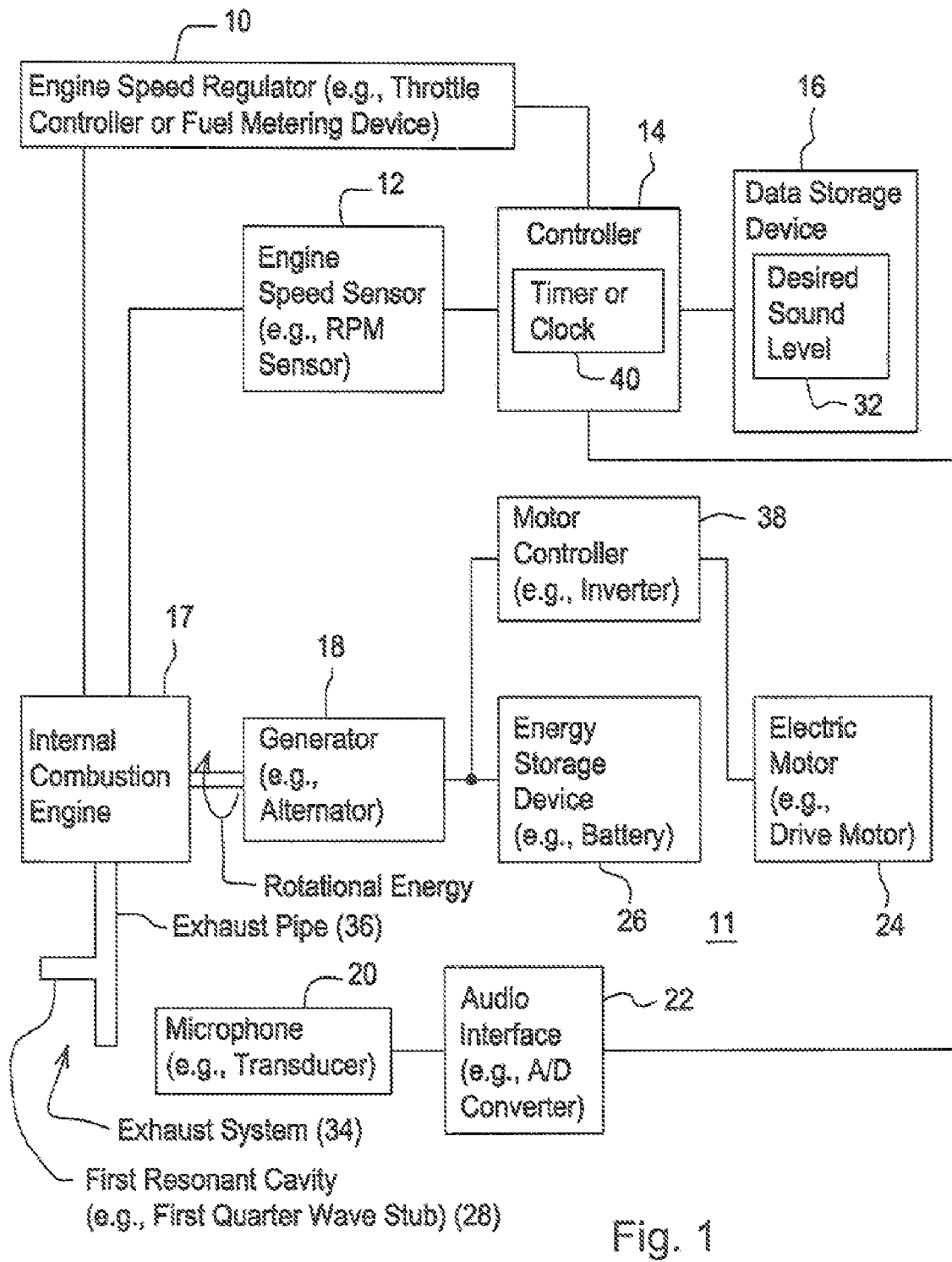
FIG. 1 is a block diagram of a first embodiment of a system for reducing noise associated with an internal combustion engine.

In accordance with one embodiment, FIG. 1 illustrates a noise reduction system 11 for any internal combustion engine. In FIG. 1, an internal combustion engine 17 is associated with an engine speed sensor 12 and a engine speed regulator 10. The engine speed sensor 12 (e.g., RPM, revolution per minute, sensor) senses a rotational speed of an engine shaft (e.g., a crank shaft). For example, the engine speed sensor 12 may measure the rotational speed of the engine shaft in revolutions per unit time or revolutions per minute (e.g., RPM).

The engine speed regulator 10 may comprise one of more of the following: a fuel regulator, an air regulator, a fuel metering device, an air metering device, a fuel injection system, an electronic fuel injections system, a direct injection fuel system, a mechanical fuel injection system, a throttle controller, a throttle body system, a carburetor, an electronic ignition system, an ignition advance or retardation device, or any other device that may be used to regulate the engine speed of an internal combustion engine 17. The engine speed regulator 10 controls the input or metering of fuel, the metering of air, or the air-fuel mixture inputted to the internal combustion engine 17, or one or more cylinders thereof. The engine speed regulator 10 may be used to regulate the engine speed (e.g., the engine shaft speed) of the internal combustion engine 17 to a target engine speed or range of target engine speeds.

The internal combustion engine 17 is connected to an exhaust system 34. For example, an exhaust manifold or one or more exhaust port(s) of the internal combustion engine 17 may be connected to the exhaust system 34. The exhaust system 34 includes a main exhaust pipe associated with one or more resonant cavities 28 or stubs. For example, in FIG. 1, the resonant cavity 28 or stub may comprise an approximately one-quarter wavelength stub or one-quarter wavelength attenuation cavity. In one embodiment, the one-quarter wavelength stub or resonant cavity is tuned such that one wavelength is generally equal to an exhaust resonant wavelength of peak amplitude at a target engine speed or target speed range of the engine shaft. The exhaust noise varies with the engine speed because it is generally related to the rate of ignition and/or combustion of fuel in one or more cylinders of the internal combustion engine 17 and the valve train timing. The one-quarter wavelength stub or resonant cavity offers attenuation at the exhaust resonant wavelength or one or more acoustic wavelengths of attenuation (e.g., over an acoustic band of wavelengths) because the stub or resonant cavity produces interfering sound waves that are generally out-of-phase with those propagating in the exhaust pipe 36 arising from the internal combustion engine 17.

The internal combustion engine 17 drives or provides mechanical energy (e.g., rotational energy) to a generator 18. The generator 18 (e.g., alternator) generates electrical energy for storage in an energy storage device 26. For example, the generator 18 may provide direct current (DC) voltage for charging the energy storage device 26. The generator 18 is coupled to an energy storage device 26. Alternatively, if the generator 18 provides an alternating current (AC) voltage, the generator 18 may be coupled to the energy storage device 26 via a rectifier (e.g., a bridge or full-wave rectifier).

The energy storage device 26 comprises batteries, capacitors, ultra-capacitors, a network of capacitors, or any combination of the foregoing items. The batteries may be any type of batteries such as lead-acid, nickel cadmium, nickel metal hydride, lithium ion, alkaline, maintenance-free, conventional, or otherwise.

A motor controller 38 is coupled to the energy storage device 26, the generator 18, or both. For instance, the motor controller 38 and generator 18 may be coupled in parallel to the energy storage device 26. The motor controller 38 may comprise any type of controller that is suitable for controlling a corresponding particular embodiment of the electric motor 24. For example, if the electric motor 24 comprises an alternating current motor, the motor controller 38 may comprise an inverter or another device for providing a suitable alternating current signal for the electric motor 24. Further, if the electric motor 24 comprises an alternating current motor, the motor controller 38 may provide one or more of the following features to control the speed or rotation of the motor shaft: variable frequency output, one or more phases of output signal, a pulse-width modulated output signal, a pulse train, a square-wave output signal of a desired frequency, and any other suitable modulation of the output signal or signals for driving an alternating current motor. If the electric motor 24 comprises a direct current motor, the motor controller 38 may provide a variable output voltage or variable output current to control the speed or rotation of the motor shaft.

The electric motor 24 comprises a drive motor for propelling a vehicle. The electric motor 24 may comprise any type of electric motor 24, including an alternating current motor, a direct current motor, a permanent magnet motor, a multiphase alternating current induction motor, a multiphase synchronous alternating current motor, a brushless direct current motor, a switched reluctance motor, or otherwise.

A controller 14 communicates with one or more of the following devices or components: the engine speed regulator 10, the engine speed sensor 12, a data storage device 16, and an audio interface 22. The interconnections between the controller 14 and the foregoing devices may be carried over one or more databuses, or other transmission lines. The controller 14 comprises a microcontroller, a microprocessor, a programmable logic array, a logic unit, or another data processor. The controller 14 may further comprise a timer or a clock 40.

The microphone 20 comprises any transducer (e.g., carbon condenser microphone, dynamic microphone, ribbon microphone, crystal microphone, piezoelectric transducer, piezoresistive transducer, or other acoustic transducer) that receives, picks-up, detects or measures sounds within the audible frequency range, sound pressure level, sound level, or loudness over a desired audible frequency response range. The desired audible frequency response range generally includes the frequency range that is associated with exhaust noise of an internal combustion engine 17. The microphone 20 may have, but need not have, good fidelity. The microphone 20 may be directional (e.g., cardiod pattern) to avoid picking up extraneous environmental noise (e.g., noise from traffic on a road or nearby vehicles or machinery).

The audio interface 22 is coupled to the microphone 20 or other transducer of sound or pressure waves. The audio interface 22 may comprise (1) an analog-to-digital (A/D) converter that converts analog signals from the microphone 20 into digital signals (e.g., sound level signals or sound pressure level signals) suitable for processing by the controller 14 and (2) a filter for filtering the sound signal in the analog and digital domain to reduce interference (e.g., from environmental noise or other equipment) on a frequency selective basis. The audio interface 22 or filter may provide filtering to attenuate, reject, filter or amplify certain frequency bands within the frequency range of the microphone 20. The filtering or attenuation may be used to attenuate extraneous environmental noise (e.g., on a frequency selective basis) from nearby vehicles or machinery that might otherwise degrade the performance or noise reduction capabilities of the system 11.

The sound level signals may be time-stamped or associated with a temporal data by the clock 40 or controller 14.

The data storage device 16 facilitates data storage and retrieval of desired sound level data 32 (e.g., sound pressure level data). The desired sound level data may be defined by one or more of the following: magnitude, frequency response, and time stamp. For example, the magnitude may be expressed as a measurement of sound pressure level or as an equivalent electrical measurement, prior to or after amplification. The desired sound level may be experimentally determined, established by customer surveys, established for compliance with technical specifications, industry standards, regulations, laws, or otherwise.

In FIG. 1, the internal combustion engine 17 provides mechanical energy to the generator 18. In turn, the generator 18 generates electrical energy for storage in the energy storage device 26. The internal combustion engine 17 has an engine shaft. The electric motor 24 is coupled to at least one of an output of the generator 18 and the energy storage device 26 via the motor controller 38. The exhaust system 34 is associated with a stub or resonant cavity 28. In one embodiment, the resonant cavity may be approximately one-quarter wavelength in length at one or more appropriate acoustic wavelengths to attenuate exhaust noise over one or more desired acoustic wavelengths of attenuation (e.g., a desired acoustic band of attenuation). In another embodiment, the resonant cavity 28 may comprise one or more tubes or chambers, each approximately one-quarter wavelength at appropriate acoustic wavelengths to attenuate exhaust noise over one or more desired acoustic wavelengths of attenuation (e.g., a desired acoustic band of attenuation). Here, the appropriate acoustic wavelength for tuning the resonant cavity is generally proportional to an operational speed (e.g., target engine speed) of the engine shaft or the firing frequency (e.g., electrical ignition firing rate or a rate of combustion caused by compression of the fuel-air mixture) of the engine.

The microphone 20 is placed in proximity to the exhaust system 34 for detecting a detected noise level or detected sound level associated with the exhaust system 34. The controller 14 controls the target engine speed or speed range based on the detected noise level (e.g., sound pressure level) and a desired noise level (e.g., desired sound pressure level). For example, the detected sound level or detected noise level is minimized by matching the target engine speed (e.g., RPM) to the static noise attenuation characteristics of the resonant cavity 28 or stub. The controller 14 changes the operational speed of the engine 17 (e.g., engine shaft) above and below a current operational speed to determine if the noise level increases or decreases with an associated deviation from the current operational speed or initial operational speed. The controller 14 causes the engine speed regulator 10 to establish a new or revised operational speed of the engine is established to minimize noise with respect to the current operational speed or initial operational speed of the engine 17 (e.g., the engine shaft).

Figure 2:
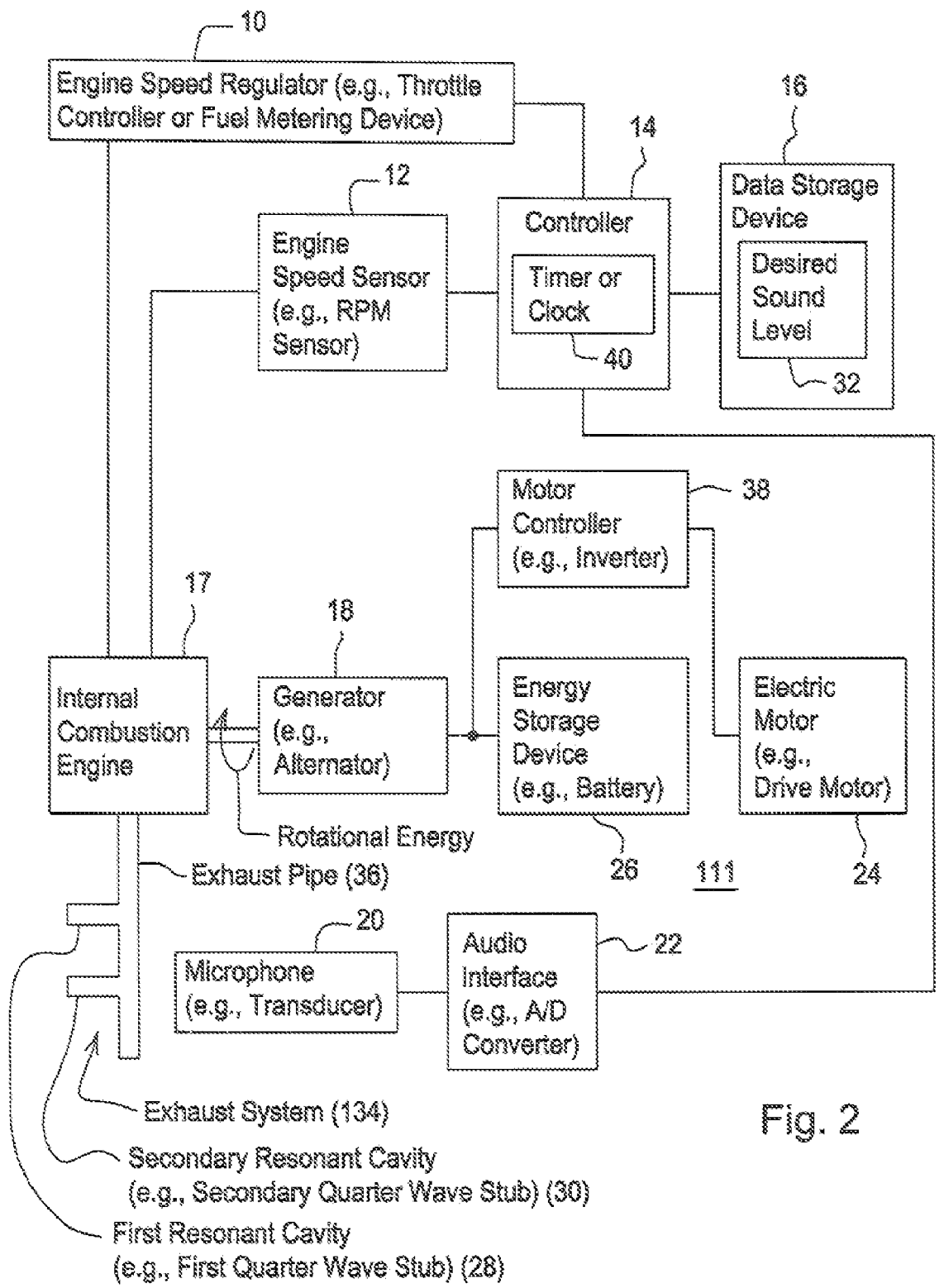
FIG. 2 is a block diagram of a second embodiment of a system for reducing noise associated with an internal combustion engine.

The noise reduction system 111 of FIG. 2 is similar to the noise reduction system 11 of FIG. 1 except the exhaust system 134 of FIG. 2 further includes a secondary cavity 30 (e.g., a secondary quarter wavelength stub). Like reference numbers in FIG. 1 and FIG. 2 indicate like elements.

The secondary resonant cavity 30 is associated with the exhaust system 134 to provide additional or supplemental attenuation of exhaust noise produced in connection with the internal combustion engine 17. The exhaust system 134 may have various alternative configurations. Under a first configuration, the secondary resonant cavity 30 (e.g., secondary quarter wavelength stub) may be tuned to substantially the same wavelength, the same fundamental frequency (e.g., resonant frequency) or the same band (e.g., a generally continuous range of wavelengths or fundamental frequencies) as the first resonant cavity 28 (e.g., first quarter wavelength stub). Under a second configuration, the secondary resonant cavity 30 (e.g., secondary quarter wavelength stub) may be tuned to a harmonic of the resonant frequency of the first resonant cavity 28 (e.g., first quarter wavelength stub). Under a third configuration, the secondary resonant cavity 30 (e.g., secondary quarter-wavelength) stub may be offset in frequency, wavelength or band from the first resonant cavity 28 (e.g., first quarter wavelength stub) to provide an aggregate, broader band of attenuation than is otherwise possible with the first resonant cavity 30 or another single cavity configuration.

Figure 3:
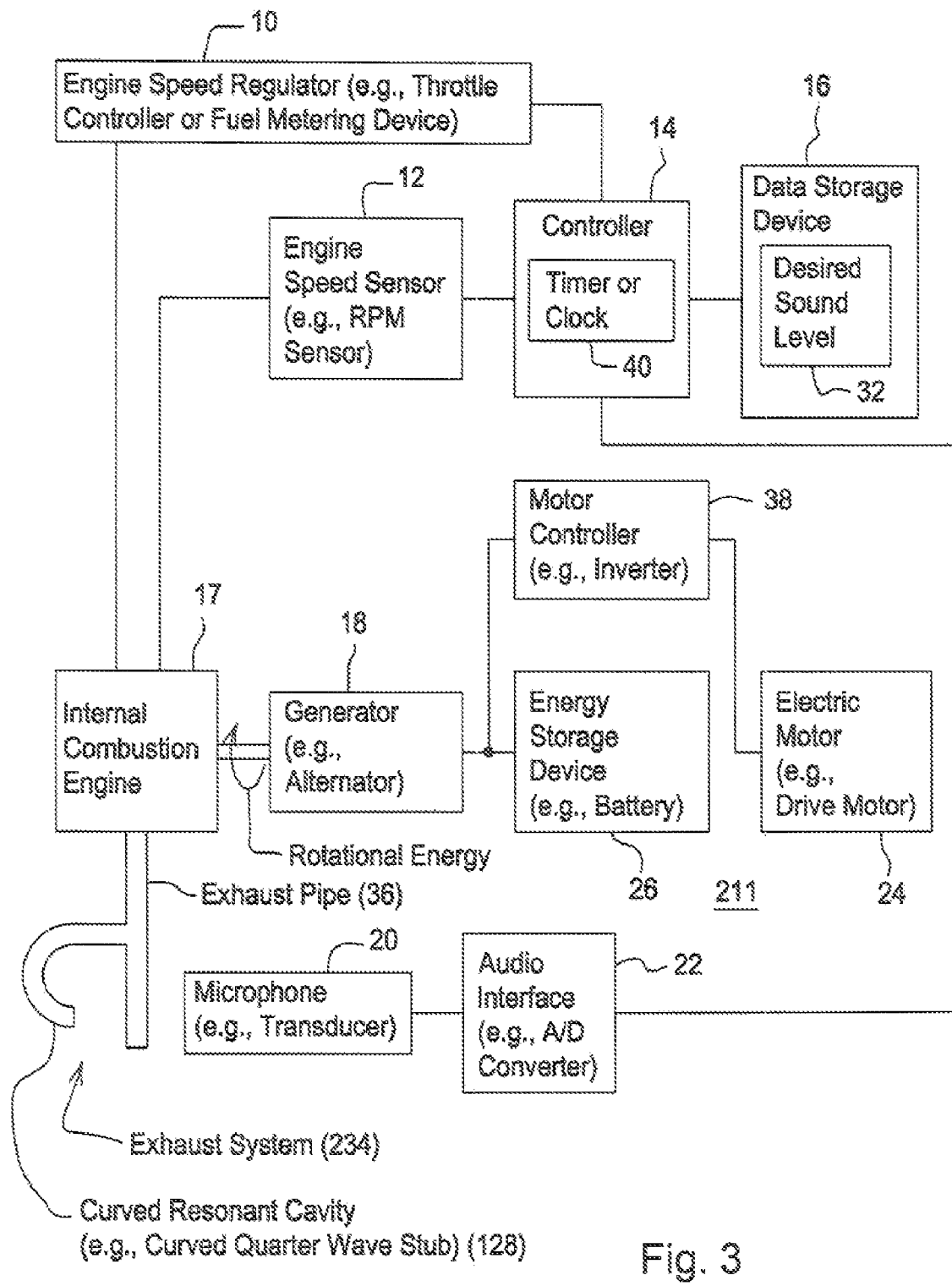
FIG. 3 is a block diagram of a third embodiment of a system for reducing noise associated with an internal combustion engine.

The system 211 of FIG. 3 is similar to the system 11 of FIG. 1 except the exhaust system 234 of FIG. 3 replaces the first resonant cavity 28 (e.g., first quarter wavelength stub) with a curved resonant cavity 128 (e.g., curved quarter wavelength stub). Like reference numbers in FIG. 1 and FIG. 3 indicate like elements.

The curved resonant cavity 128 may be shaped as a spiral, a modified spiral, or another curved resonant cavity that attenuates exhaust noise over a desired frequency range, desired wavelength range, a desired frequency band, or a desired wavelength. The curved resonant cavity 128 may be used where spatial constraints dictate a more compact exhaust system 234 than the exhaust system 34 of FIG. 1. The controller 14 is capable of adjusting the target engine speed to tune the exhaust noise to a resonant frequency, a resonant wavelength, a frequency band or range, or a wavelength band or range of a curved resonant cavity 128 that is physically compact without any need to predict accurately the resonant frequency, resonant wavelength, or a frequency range or band of the curved resonant cavity 128 in advance.

Figure 4:
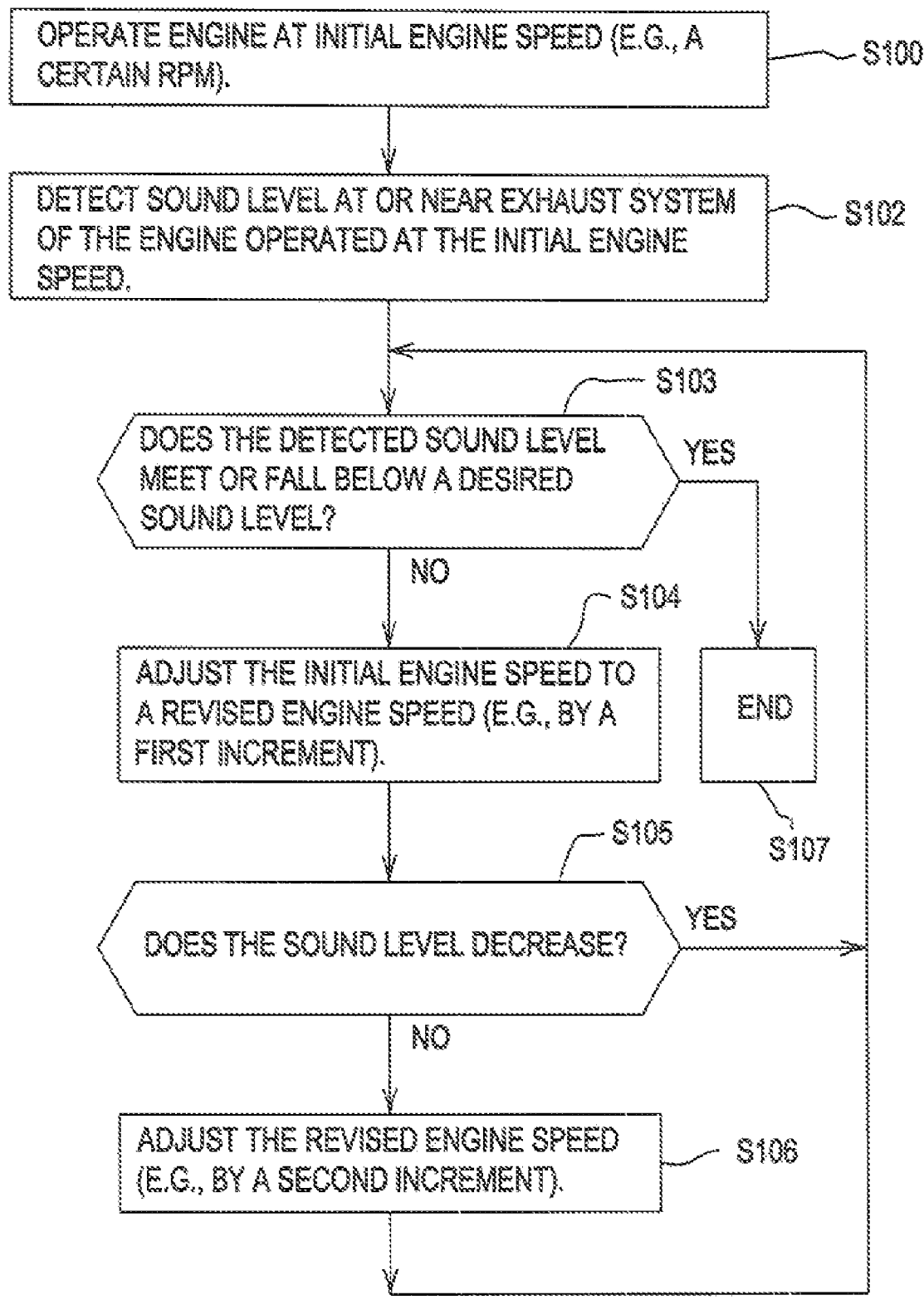
FIG. 4 is a flow chart of one embodiment of a method for reducing noise associated with an internal combustion engine.

FIG. 4 illustrates a method of reducing exhaust noise associated within an internal combustion engine (e.g., 17). The method of FIG. 4 begins in step S100.

In step S100, a controller 14 or engine speed regulator 10 operates an internal combustion engine 17 at an initial speed. The controller 14 may use feedback from the engine speed sensor 12 to adjust or maintain the initial speed within a desired speed range. The desired speed range may, but need not, change based on operator demand, and load on the internal combustion engine 17.

In step S102, a microphone 20 or other transducer detects a sound level (e.g., sound pressure level or noise level) at or near an exhaust system 34 (e.g., an exhaust pipe outlet) of the internal combustion engine 17.

In step S102, a controller 14 or data processor determines whether the detected sound level meets or falls below a desired sound level 32. The detected sound level may be regarded as synonymous with a detected noise level; the desired sound level may be regarded as synonymous with a desired noise level. Any of the foregoing noise levels or sound levels may be defined or described in terms of sound pressure levels, decibels above or below a defined reference level, or otherwise. If the detected sound level meets of falls below the desired sound level 32, the method ends in step S107. However, if the detected sound level does not meet or fall below the desired sound level 32, the method continues with step S104

In step S104, the controller 14 or the engine speed regulator 10 adjusts the initial speed to a revised speed. For example, the controller 14 adjusts the initial speed to a revised speed by a first increment. In one embodiment, the controller 14 keeps a record of current and previous adjustments to the initial speed or revised speed, along with respective detected sound level in the data storage device 16. Further, such records may be time stamped. Accordingly, the controller 14 avoids duplicative adjustments that would not be effective in reducing the noise arising from the internal combustion engine 17.

In step S105, the controller 14 or data processor determines whether the detected sound level decreased or not for the revised speed. If the sound level decreased, the method returns to step S103. However, if the sound level did not decrease, the method continues with step S106.

In step S106, the controller 14 or engine speed regulator 10 adjusts the revised speed. For example, the controller 14 or engine speed regulator 10 adjusts the revised speed by a second increment. In one embodiment, the controller 14 keeps a record of current and previous adjustments to the initial speed or revised speed, along with respective detected sound level in the data storage device 16. Further, such records may be time stamped. Accordingly, the controller 14 avoids duplicative adjustments that would not be effective in reducing the noise arising from the internal combustion engine 17.

Figure 5:
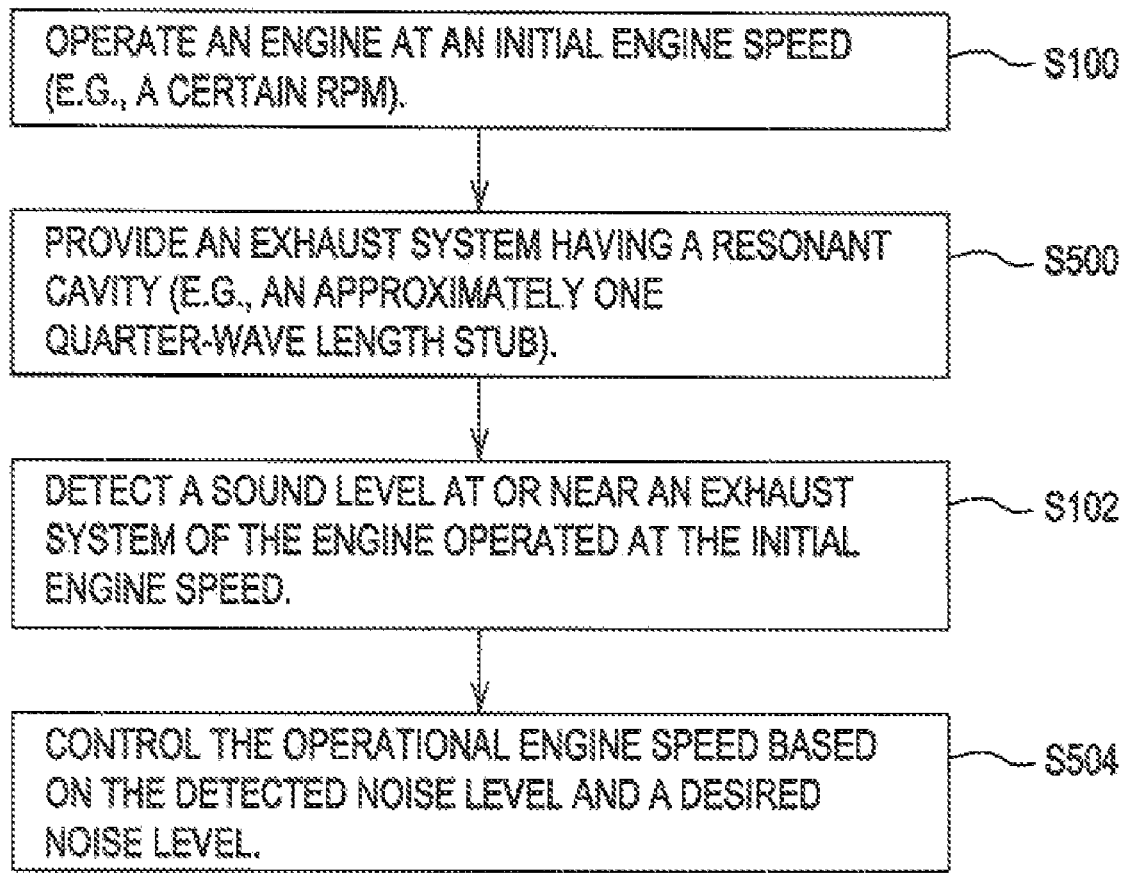
FIG. 5 is a flow chart of another embodiment of a method for reducing noise associated with an internal combustion engine.

FIG. 5 illustrates a method for reducing noise associated with an internal combustion engine 17. The method of FIG. 5 begins in step S100. Like reference numbers FIG. 4 and FIG. 5 indicate like steps or procedures.

In step S100, a controller 14 or engine speed regulator 10 operates an internal combustion engine 17 at an initial speed. The controller 14 may use feedback from the engine speed sensor 12 to adjust or maintain the initial speed within a desired speed range. The desired speed range may, but need not, change based on operator demand, and load on the internal combustion engine 17.

In step S500, an exhaust system (e.g., 34, 134 or 234) has a resonant cavity for attenuating exhaust noise arising from the internal combustion engine 17. For example, the exhaust system (e.g., 34, 134 or 234) has an approximately one quarter wavelength stub for attenuating exhaust noise arising from the internal combustion engine 17. In an alternate embodiment, step S500 is carried out by providing an exhaust system (e.g., 34, 134 or 234) with at least two quarter wavelength stubs. For example, a secondary quarter-wave stub may be tuned to increase attenuation at one or more desired acoustic wavelengths (e.g., increase attenuation at a fundamental wavelength of peak attenuation or a harmonic wavelength of the peak attenuation associated with the exhaust system or over a desired wavelength band).

In step S502, a microphone 20 or transducer detects a sound level at or near an exhaust system 34 of the engine operated the initial speed.

In step S504, a controller 14 or engine speed regulator 10 controls the operational speed based on the detected noise level and a desired noise level. Here, the operational speed shall mean a target engine speed or a target engine speed range of an output shaft (e.g., crankshaft) of the internal combustion engine 17. The detected noise level may refer to detected sound pressure level, detected sound level, an analog electrical signal level (e.g., voltage amplitude, current amplitude, root mean square power or peak-to-peak voltage) produced by or derived from an output of the microphone 20, a digital signal derived from the analog signal, or otherwise. Similarly, the desired noise level may refer to a desired sound pressure level, detected sound level, or otherwise.

Step S504 may be carried out in accordance with various techniques that may be applied individually or cumulatively. In accordance with a first technique, the controller 14 controls the operational speed (e.g., target engine speed) to minimize a difference between the detected noise level (e.g., detected sound pressure level over an audible frequency range) and a desired noise level (e.g., desired sound pressure level over an audible frequency range). In accordance with a second technique, the controller 14 adjusts the operational speed (e.g., target engine speed) to a revised speed by an increment to determine of the noise level decreases or falls below the desired sound level 32. In accordance with a third technique, the controller 14 adjusts the operational speed (e.g., target engine speed) of the engine to a discrete number of test operational speeds and determines a corresponding noise level for each test operational speed. In accordance with a fourth technique, the controller 14 establishes a test operational speed associated with a lowest corresponding noise level represents a target operational speed of the internal combustion engine 17. In accordance with a fifth technique, the controller 14 adjusts the operational speed periodically during operation of the internal combustion engine 17 to compensate for thermal expansion of the exhaust method.

Figure 6:
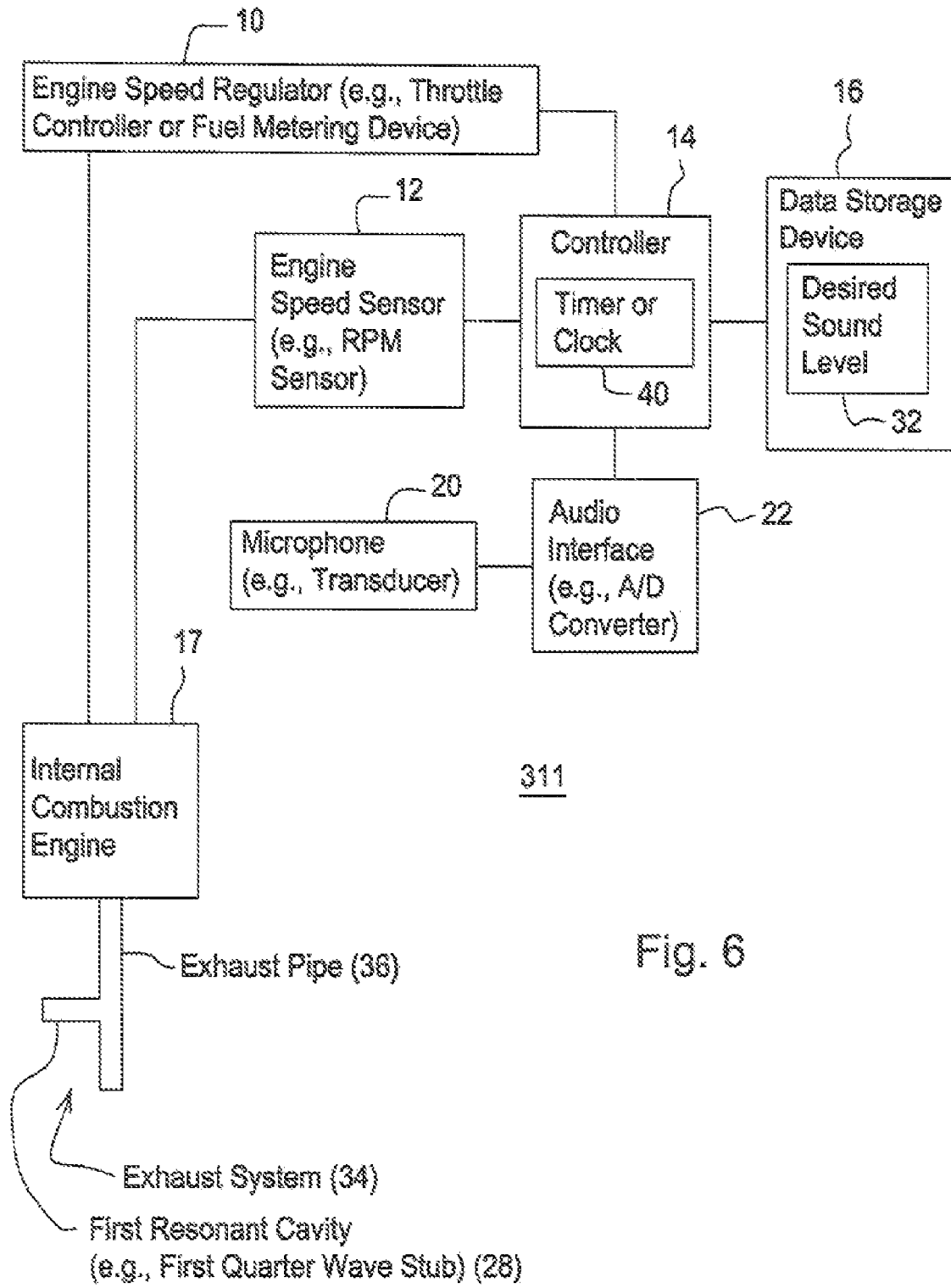
FIG. 6 is a block diagram of a fourth embodiment of a system for reducing noise associated with an internal combustion engine.

The noise reduction system 311 of FIG. 6 is similar that the noise reduction system 11 of FIG. 1, except the notice reduction 311 of FIG. 6 relates to an internal combustion engine configuration that is not operating in a hybrid mode. The vehicle associated with the noise reduction system 311 of FIG. 6 is propelled by the rotational mechanical energy outputted by the internal combustion engine 17, as opposed to an electric motor 24 of FIG. 1. Accordingly, the noise reduction system of FIG. 6 omits the generator 18, the motor controller 38, the energy storage device 26, and the electric motor 24. Like elements in FIG. 1 and FIG. 6 indicate like elements.

The noise reduction system 311 of FIG. 6 may be used to reduce the emitted noise level over one or more noise-regulated engine speed ranges within the operational range of the engine 17. The exhaust system 34, or a first resonant cavity 28, may be tuned to attenuate exhaust noise over one or more noise-regulated engine speed ranges (e.g., an idle engine speed range or a typical operational speed range). The first resonant cavity 28 may be tuned by selecting the dimensions of the first resonant cavity to be a quarter wavelength at the desired acoustic frequency of peak attenuation, for instance. The desired acoustic frequency of peak attenuation may be associated with or matched to a particular magnitude versus frequency response of emitted exhaust noise attributed to operating the engine in the a corresponding noise-regulated engine speed range.

In one example, the controller 14 may shift an engine idle speed within an engine idle speed range to reduce or minimize the emitted noise level (e.g., by better matching the dominant acoustic frequency content, or peak amplitude content, of the emitted exhaust noise to the particular attenuation and resonance characteristics of the exhaust system 34). In particular, the controller 14 may send a command signal or data to the engine speed regulator 10 to increase or decrease an initial engine idle speed to a revised engine idle speed to reduce or minimize the emitted noise level associated with the exhaust system 34. Both the initial engine idle speed and the revised engine idle speed may lie within an engine idle speed range or a noise-regulated engine speed range. The vehicle may be stationary or mobile when operating within the engine idle speed range. If the vehicle is mobile, the shift in idle speed may cause a change in vehicular ground speed, unless an infinitely variable transmission, a hydraulic drive, or a hydrostatic transmission associated with the vehicle compensates for (e.g., changes a drive ratio or gear ratio) the shift in idle speed to maintain a desired ground speed with reduced exhaust noise.

In another example, the controller 14 may shift an operational engine speed within an operational engine speed range to reduce or minimize the emitted noise level (e.g., by better matching the dominant acoustic frequency content, or peak amplitude content, of the emitted exhaust noise to the particular attenuation and resonance characteristics of the exhaust system 34). In particular, the controller 14 may send a command signal or data to the engine speed regulator 10 to increase or decrease an initial engine operational speed to a revised engine operational speed to reduce or minimize the emitted noise level associated with the exhaust system 34. Both the initial engine operational speed and the revised engine operational speed may lie within an engine operational speed range or a noise-regulated engine speed range. If the vehicle is mobile, the shift in operational speed may cause a change in vehicular ground speed, unless an infinitely variable transmission, a hydraulic drive, or a hydrostatic transmission associated with the vehicle compensates for (e.g., changes a drive ratio or gear ratio) the shift in engine speed to maintain a desired ground speed with reduced exhaust noise.

The engine idle speed range and the noise-regulated engine speed may be stored in the data storage device 16. In the illustrative configuration of FIG. 6, if the engine 17 operates outside the noise-regulated engine speed range, the controller 14 may be programmed or instructed to ignore the detected noise level outside of the noise-regulated engine speed range. However, in other configurations (e.g., FIG. 1 through FIG. 3, among others), the engine 17 may be controlled to fall within a desired engine speed range for hybrid mode operation.

Figure 7:
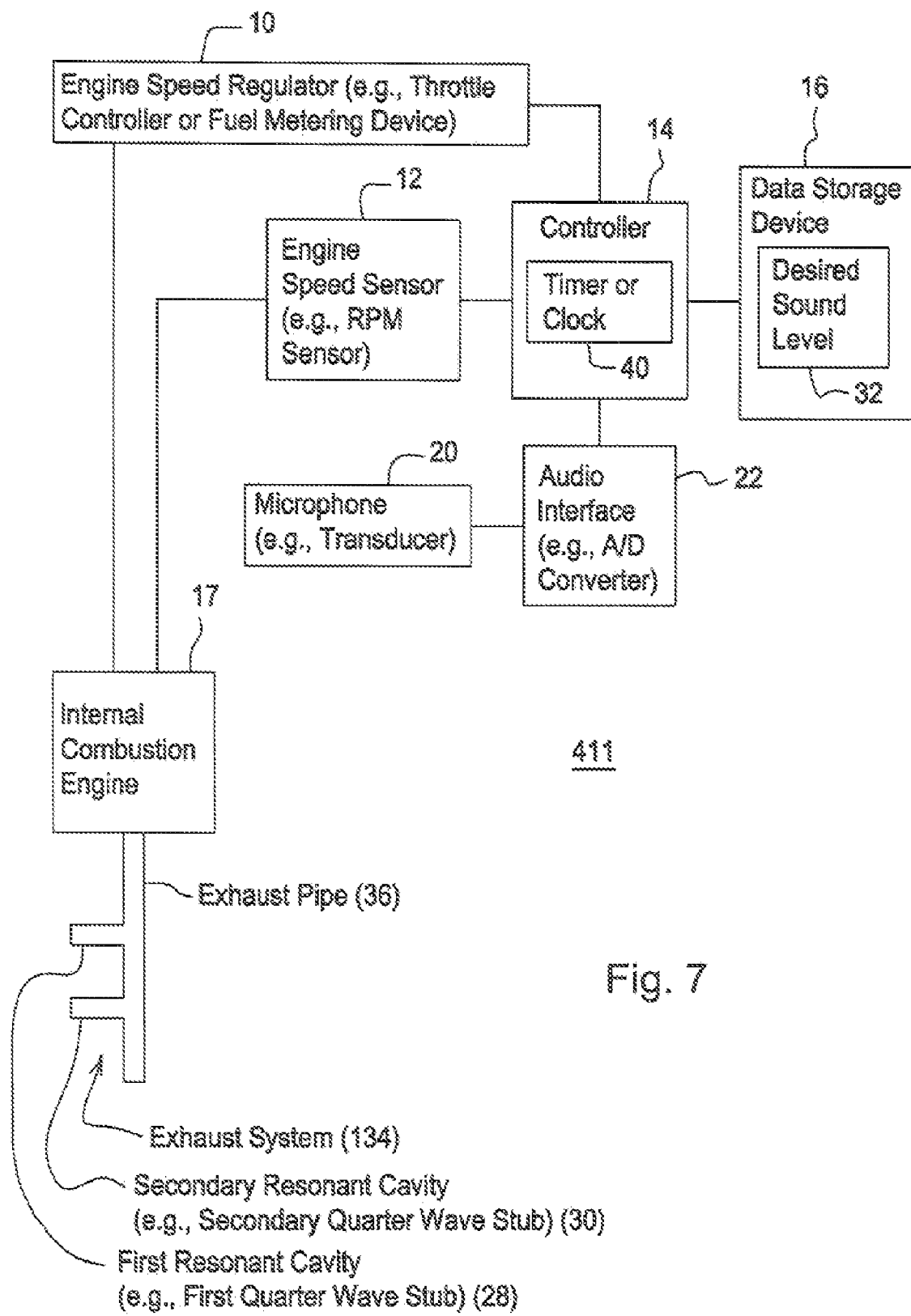
FIG. 7 is a block diagram of a fifth embodiment of a system for reducing noise associated with an internal combustion engine.

The noise reduction system 411 of FIG. 7 is similar to the noise reduction system 311 of FIG. 6 except the exhaust system 134 of FIG. 7 further includes a secondary cavity 30 (e.g., a secondary quarter wavelength stub). Like reference numbers in FIG. 6 and FIG. 7 indicate like elements.

The secondary resonant cavity 30 is associated with the exhaust system 134 to provide additional or supplemental attenuation of exhaust noise produced in connection with the internal combustion engine 17. The exhaust system 134 may have various alternative configurations. Under a first configuration, the secondary resonant cavity 30 (e.g., secondary quarter wavelength stub) may be tuned to the same wavelength, the same fundamental frequency (e.g., resonant frequency), the same wavelength band, or the same frequency band as the first resonant cavity 28 (e.g., first quarter wavelength stub). Under a second configuration, the secondary resonant cavity 30 (e.g., secondary quarter wavelength stub) may be tuned to a harmonic of the resonant frequency, resonant wavelength, resonant band, or resonant range of the first resonant cavity 28 (e.g., first quarter wavelength stub). Under a third configuration, the secondary resonant cavity 30 (e.g., secondary quarter-wavelength) stub may be offset in frequency from the first resonant cavity 28 (e.g., first quarter wavelength stub) to provide an aggregate, broader band of attenuation than is otherwise possible with the first resonant cavity 30 or another single cavity configuration.

The noise reduction system 411 of FIG. 7 may be used to reduce the emitted noise level over one or more noise-regulated engine speed ranges within the operational range of the engine 17. The exhaust system 134 may be tuned to attenuate exhaust noise over one or more noise-regulated engine speed ranges (e.g., an idle engine speed range or a typical operational speed range). The first resonant cavity 28 may be tuned by selecting the dimensions of the first resonant cavity to be a quarter wavelength at a first desired acoustic frequency of peak attenuation, for instance. The second resonant cavity 30 may be tuned by selecting the dimensions of the second resonant cavity 30 to be a quarter wavelength at a second desired acoustic frequency of peak attenuation, where the second desired acoustic frequency is approximately equal to or offset from the first desired acoustic frequency. The desired acoustic frequency of peak attenuation may be associated with or matched to a particular magnitude versus frequency response of emitted exhaust noise attributed to operating the engine in the a corresponding noise-regulated engine speed range.

In one example, the controller 14 may shift an engine idle speed within an engine idle speed range to reduce or minimize the emitted noise level (e.g., by better matching the dominant acoustic frequency content, or peak amplitude content, of the emitted exhaust noise to the particular attenuation and resonance characteristics of the exhaust system 134). In particular, the controller 14 may send a command signal or data to the engine speed regulator 10 to increase or decrease an initial engine idle speed to a revised engine idle speed to reduce or minimize the emitted noise level associated with the exhaust system 134. Both the initial engine idle speed and the revised engine idle speed may lie within an engine idle speed range or a noise-regulated engine speed range. The vehicle may be stationary or mobile when operating within the engine idle speed range. If the vehicle is mobile, the shift in engine idle speed may cause a change in vehicular ground speed, unless an infinitely variable transmission, a hydraulic drive, or a hydrostatic transmission associated with the vehicle compensates for (e.g., changes a drive ratio or gear ratio) the shift in idle speed to maintain a desired ground speed with reduced exhaust noise.

In another example, the controller 14 may shift an operational engine speed within an operational engine speed range to reduce or minimize the emitted noise level (e.g., by better matching the dominant acoustic frequency content, or peak amplitude content, of the emitted exhaust noise to the particular attenuation and resonance characteristics of the exhaust system 134). In particular, the controller 14 may send a command signal or data to the engine speed regulator 10 to increase or decrease an initial engine operational speed to a revised engine operational speed to reduce or minimize the emitted noise level associated with the exhaust system 134. Both the initial engine operational speed and the revised engine operational speed may lie within an engine operational speed range or a noise-regulated engine speed range. If the vehicle is mobile, the shift in operational engine speed may cause a change in vehicular ground speed, unless an infinitely variable transmission, a hydraulic drive, or a hydrostatic transmission associated with the vehicle compensates for (e.g., changes a drive ratio or gear ratio) the shift in engine speed to maintain a desired ground speed with reduced exhaust noise.

The engine idle speed range and the noise-regulated engine speed may be stored in the data storage device 16. In the illustrative configuration of FIG. 7, if the engine 17 operates outside the noise-regulated engine speed range, the controller 14 may be programmed or instructed to ignore the detected noise level outside of the noise-regulated engine speed range. However, in other configurations (e.g., FIG. 1 through FIG. 3, among others), the engine 17 may be controlled to fall within a desired engine speed range for hybrid mode operation.

Figure 8:
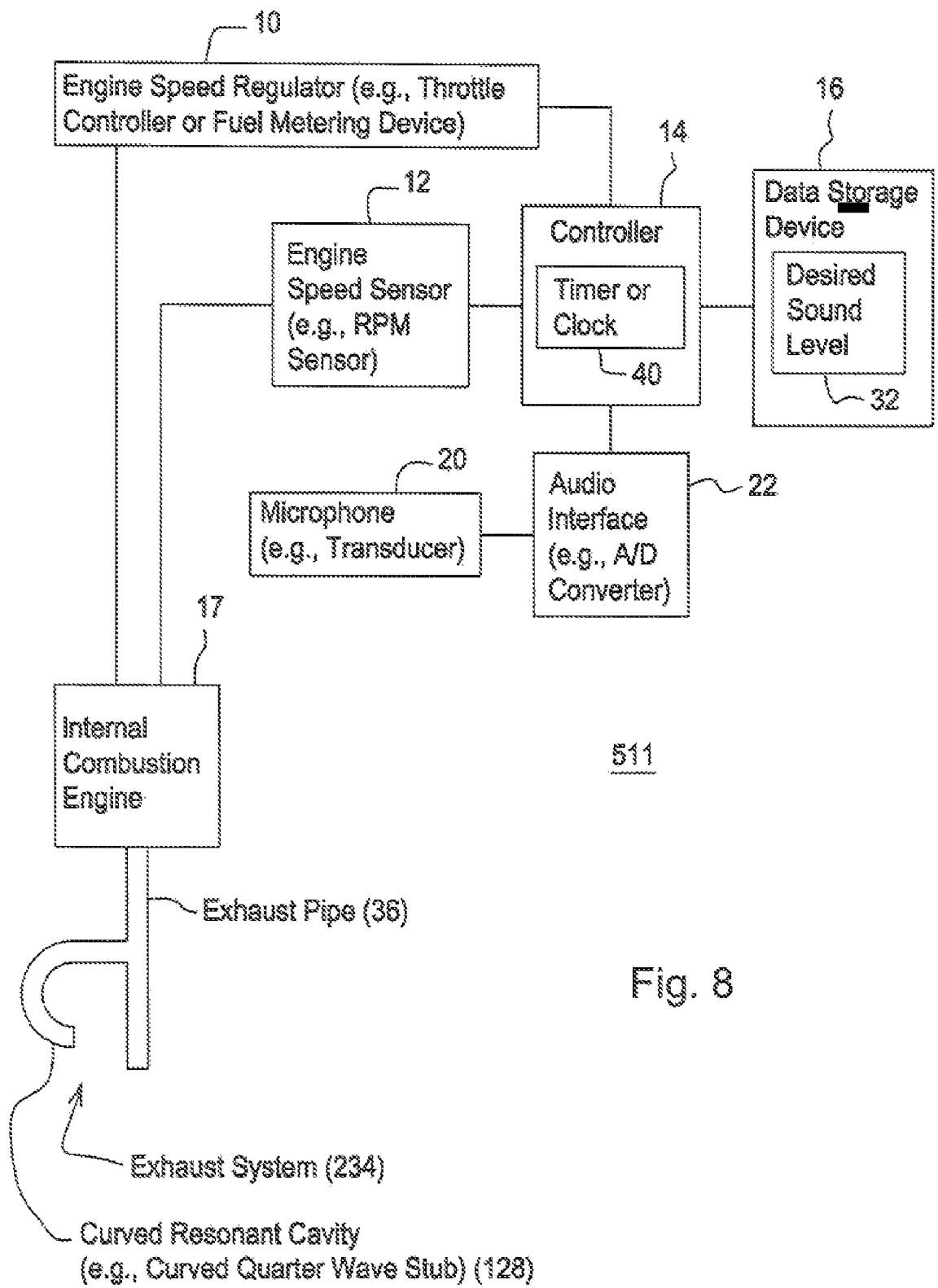
FIG. 8 is a block diagram of a sixth embodiment of a system for reducing noise associated with an internal combustion engine.

The system 511 of FIG. 8 is similar to the system 11 of FIG. 6 except the exhaust system 234 of FIG. 8 replaces the first resonant cavity 28 (e.g., first quarter wavelength stub) with a resonant cavity 128 (e.g., curved resonant cavity or curved quarter wavelength stub). Like reference numbers in FIG. 6 and FIG. 8 indicate like elements.

The resonant cavity 128 (e.g. curved resonant cavity) may be shaped as a spiral, a modified spiral, or another curved resonant cavity that attenuates exhaust noise over a desired frequency range or desired wavelength range. In an alternate embodiment, the resonant cavity 128 may be folded upon itself, nested, or otherwise packaged compactly to reduce the spatial requirements for the exhaust system 234. The resonant cavity 128 may be used where spatial constraints dictate a more compact exhaust system 234 than the exhaust system 34 of FIG. 6. The controller 14 is capable of adjusting the target engine speed to tune the exhaust noise to a resonant frequency of a resonant cavity 128 (e.g., curved resonant cavity) that is physically compact without any need to predict accurately the resonant frequency of the resonant cavity 128 in advance.

The noise reduction system 511 of FIG. 8 may be used to reduce the emitted noise level over one or more noise-regulated engine speed ranges within the operational range of the engine 17. The exhaust system 234, or resonant cavity 128, may be tuned to attenuate exhaust noise over one or more noise-regulated engine speed ranges (e.g., an idle engine speed range or a typical operational speed range). The resonant cavity 128 may be tuned by selecting the dimensions of the first resonant cavity to be a quarter wavelength at the desired acoustic frequency of peak attenuation, for instance. The desired acoustic frequency of peak attenuation may be associated with or matched to a particular magnitude versus frequency response of emitted exhaust noise attributed to operating the engine in the a corresponding noise-regulated engine speed range.

In one example, the controller 14 may shift an engine idle speed within an engine idle speed range to reduce or minimize the emitted noise level (e.g., by better matching the dominant acoustic frequency content, or peak amplitude content, of the emitted exhaust noise to the particular attenuation and resonance characteristics of the exhaust system 234). In particular, the controller 14 may send a command signal or data to the engine speed regulator 10 to increase or decrease an initial engine idle speed to a revised engine idle speed to reduce or minimize the emitted noise level associated with the exhaust system 234. Both the initial engine idle speed and the revised engine idle speed may lie within an engine idle speed range or a noise-regulated engine speed range. The vehicle may be stationary or mobile when operating within the engine idle speed range. If the vehicle is mobile, the shift in idle speed may cause a change in vehicular ground speed, unless an infinitely variable transmission, a hydraulic drive, or a hydrostatic transmission associated with the vehicle compensates for (e.g., changes a drive ratio or gear ratio) the shift in idle speed to maintain a desired ground speed with reduced exhaust noise.

In another example, the controller 14 may shift an operational engine speed within an operational engine speed range to reduce or minimize the emitted noise level (e.g., by better matching the dominant acoustic frequency content, or peak amplitude content, of the emitted exhaust noise to the particular attenuation and resonance characteristics of the exhaust system 234). In particular, the controller 14 may send a command signal or data to the engine speed regulator 10 to increase or decrease an initial engine operational speed to a revised engine operational speed to reduce or minimize the emitted noise level associated with the exhaust system 234. Both the initial engine operational speed and the revised engine operational speed may lie within an engine operational speed range or a noise-regulated engine speed range. If the vehicle is mobile, the shift in operational speed may cause a change in vehicular ground speed, unless an infinitely variable transmission, a hydraulic drive, or a hydrostatic transmission associated with the vehicle compensates for (e.g., changes a drive ratio or gear ratio) the shift in engine speed to maintain a desired ground speed with reduced exhaust noise The engine idle speed range and the noise-regulated engine speed may be stored in the data storage device 16. In the illustrative configuration of FIG. 8, if the engine 17 operates outside the noise-regulated engine speed range, the controller 14 may be programmed or instructed to ignore the detected noise level outside of the noise-regulated engine speed range. However, in other configurations (e.g., FIG. 1 through FIG. 3, among others), the engine 17 may be controlled to fall within a desired engine speed range for hybrid mode operation.

The noise reduction system and method of this invention may be applied to any internal combustion engine, or any vehicle that uses an internal combustion engine. For example, any embodiment of the noise reduction system and method may be applied to a hybrid vehicle. A hybrid vehicle may be propelled by an internal combustion engine, an electric motor, or both.

The noise reduction system and method facilitates manufacturing exhaust systems and resonant cavities with less critical or lower manufacturing tolerances than otherwise possible, while still achieving a desired level of exhaust noise attenuation. The noise reduction system and method is well-suited for compensating for variations in manufacturing tolerances for exhaust systems that use resonant cavities, including but no limited to quarter wavelength stubs, curved quarter wavelength stubs, and the like. The controller may adjust the engine speed to compensate for unpredictable noise attenuation characteristics of curved quarter wavelength stubs, for instance. In some configurations, the noise reduction system and method may be used to eliminate one or more mufflers from an exhaust system.

Having described the preferred embodiment, it will become apparent that various modifications can be made without departing from the scope of the invention as defined in the accompanying claims.

The invention claimed is:

1. A system for reducing noise associated with an internal combustion engine, the system comprising:
   the internal combustion engine for operating at an operational speed of an engine shaft;
   an exhaust system associated with a resonant cavity at one or more desired acoustic wavelengths of attenuation;
   a microphone placed in proximity to the exhaust system for detecting a noise level associated with the exhaust system; and
   a controller for controlling the operational speed of the internal combustion engine based on the detected noise level and a desired noise level.

2. The system according to claim 1 wherein the controller controls the operational speed to minimize a difference between the detected noise level and the desired noise level.

3. The system according to claim 1 wherein the controller adjusts the operational speed to a revised speed by an increment to determine if the detected noise level decreases or falls below the desired noise level.

4. The system according to claim 1 wherein the controller adjusts the operational speed of the internal combustion engine to a discrete number of test operational speeds and detects a corresponding detected noise level for each test operational speed.

5. The system according to claim 4 wherein a test operational speed associated with a lowest corresponding detected noise level represents a target operational speed for subsequent control of the internal combustion engine.

6. The system according to claim 1 wherein the controller adjusts the operational speed periodically during operation of the internal combustion engine to compensate for thermal expansion of the exhaust system.

7. The system according to claim 1 further comprising:
   an audio interface for providing an interface between the microphone and the converter; the audio interface converting analog microphone signal into a digital signal and attenuating interference on a frequency selective basis.

8. The system according to claim 1 further comprising:
   an engine speed regulator for controlling the flow or metering of fuel to the internal combustion engine, the controller providing a control signal to the engine speed regulator.

9. The system according to claim 1 wherein the exhaust system further comprises a secondary resonant cavity tuned to increase attenuation at one or more desired acoustic wavelengths.

10. The system according to claim 1 wherein the resonant cavity is generally curved or generally spiral to reduce spatial requirements for the exhaust system.

11. The system according to claim 1 further comprising:
    a generator for generating electrical energy;
    an energy storage device for storing the generated electrical energy;
    the internal combustion engine for providing mechanical energy to the generator; and
    an electric motor coupled to at least one of an output of the generator and the energy storage device.

12. The system according to claim 1 wherein the controller changes the operational speed above and below a current operational speed of the internal combustion engine to determine if the detected noise level increases or decreases with an associated deviation from the current operational speed.

13. The system according to claim 12 wherein a new operational speed of the internal combustion engine is established to minimize noise with respect to the current operational speed.

14. The system according to claim 1 wherein the resonant cavity comprises one or more chambers of approximately one-quarter wavelength in length at one or more desired acoustic frequencies of attenuation.

15. The system according to claim 1 wherein the controller keeps a record of a current adjustment of speed, a previous adjustment of speed, and the detected noise level.

16. The system according to claim 1 wherein the controller is capable of adjusting the operational speed of the internal combustion engine to tune the exhaust noise to the one or more desired acoustic wavelengths of attenuation.

17. A method for reducing noise associated with an internal combustion engine, the method comprising:
    operating the internal combustion engine at an initial speed;
    providing an exhaust system having a resonant cavity for noise reduction;
    detecting a sound level at or near an exhaust system of the internal combustion engine operated at the initial speed; and
    adjusting the initial speed to a revised speed if the detected sound level does not meet or fall below a desired sound level.

18. The method according to claim 17 further determining whether the detected sound level, associated with the revised speed, falls below the desired sound level.

19. The method according to claim 18 comprises adjusting the revised speed again if the detected sound level associated with the revised speed does not fall below the desired sound level.

20. A method for reducing noise associated with an internal combustion engine, the method comprising:

operating the internal combustion engine at an initial speed;

providing an exhaust system having a resonant cavity for noise reduction;

detecting a sound level at or near an exhaust system of the internal combustion engine operated the initial speed; and controlling the operational speed based on the detected noise level and a desired noise level.

21. The method according to claim 20 wherein the controlling comprises controlling the operational speed to minimize a difference between the detected noise level and the desired noise level.

22. The method according to claim 20 wherein the controlling comprises adjusting the operational speed to a revised speed by an increment to determine if the noise level decreases or falls below the desired sound level.

23. The method according to claim 20 wherein the controlling comprises adjusting the operational speed of the internal combustion engine to a discrete number of test operational speeds and determining a corresponding detected noise level for each test operational speed.

24. The method according to claim 20 wherein the controlling comprises establishing a test operational speed associated with a lowest detected corresponding noise level, the test operational speed representing a target operational speed of the internal combustion engine.

25. The method according to claim 20 wherein the controlling comprises adjusting the operational speed periodically during operation of the internal combustion engine to compensate for thermal expansion of the exhaust system.

26. The method according to claim 20 further comprising providing a secondary quarter-wave stub tuned to increase attenuation at one or more desired acoustic wavelengths.

* * * * *